(12) United States Patent  
Nakazawa et al.

(10) Patent No.: US 10,782,424 B2  
(45) Date of Patent: Sep. 22, 2020

(54) INFORMATION PROCESSING DEVICE, RADIATION DETECTOR, RADIATION IMAGING DEVICE, AND PROGRAM

(71) Applicant: Shimadzu Corporation, Kyoto (JP)

(72) Inventors: Masayuki Nakazawa, Seika-cho (JP); Tomoaki Tsuda, Kyoto (JP)

(73) Assignee: Shimadzu Corporation, Nishinokyo-Kuwabaracho, Nakagyo-ku, Kyoto-shi, Kyoto (JP)

( * ) Notice: Subject to any disclaimer, the term of this patent is extended or adjusted under 35 U.S.C. 154(b) by 437 days.

(21) Appl. No.: 15/760,781

(22) PCT Filed: Sep. 17, 2015

(86) PCT No.: PCT/JP2015/076576  
§ 371 (c)(1),  
(2) Date: Mar. 16, 2018

(87) PCT Pub. No.: WO2017/046928  
PCT Pub. Date: Mar. 23, 2017

(65) Prior Publication Data  
US 2018/0284297 A1    Oct. 4, 2018

(51) Int. Cl.  
*G01T 1/20* (2006.01)  
*G01T 1/208* (2006.01)  
*G01T 1/202* (2006.01)

(52) U.S. Cl.  
CPC ............. *G01T 1/2006* (2013.01); *G01T 1/20* (2013.01); *G01T 1/202* (2013.01); *G01T 1/208* (2013.01)

(58) Field of Classification Search  
CPC .................................................. G01T 1/208  
See application file for complete search history.

(56) References Cited

U.S. PATENT DOCUMENTS

| 5,862,061 A | 1/1999 | Yamashita et al. |
| 2006/0086913 A1 | 4/2006 | Spahn |

(Continued)

FOREIGN PATENT DOCUMENTS

| JP | H07-294649 A | 11/1995 |
| JP | H11-72566 | 3/1999 |

(Continued)

OTHER PUBLICATIONS

Written Opinion of the International Searching Authority dated Nov. 24, 2015 for PCT Application PCT/JP2015/076576.

(Continued)

*Primary Examiner* — Yara B Green  
(74) *Attorney, Agent, or Firm* — Muir Patent Law, PLLC

(57) ABSTRACT

Provided is a radiation detector that is capable of accurately calculating the time of occurrence of fluorescence. In addition to a configuration that calculates a single signal time, the present invention, in view of the case in which a multiple event occurs, also has a configuration that on the basis of an added signal generated by adding detection signals together, calculates the time of occurrence of fluorescence (added signal time). The radiation detector according to the present invention is configured to output the added signal time as the time of occurrence of fluorescence when the number of detection elements 3a in the fluorescence detection is plural (at the time of a multiple event). In the case of a multiple event, from the viewpoint of strengthening of a signal addition, an added signal time is more accurate than a single signal time.

11 Claims, 16 Drawing Sheets

(56) References Cited

U.S. PATENT DOCUMENTS

| | | | |
|---|---|---|---|
| 2011/0017916 A1* | 1/2011 | Schulz | G01T 1/202 |
| | | | 250/368 |
| 2011/0062340 A1 | 3/2011 | Gagnon | |
| 2011/0127435 A1 | 6/2011 | Nakamura | |
| 2011/0155898 A1 | 6/2011 | Burr et al. | |
| 2014/0021354 A1 | 1/2014 | Gagnon et al. | |

FOREIGN PATENT DOCUMENTS

| | | |
|---|---|---|
| JP | 2006-105995 A | 4/2006 |
| JP | 2011-059099 A | 3/2011 |
| JP | 2011-137821 A | 7/2011 |
| JP | 2014-21123 A | 2/2014 |
| WO | WO 2009/157526 A1 | 12/2009 |

OTHER PUBLICATIONS

International Search Report for PCT Application PCT/JP2015/076576.

* cited by examiner

Element that detected fluorescent

Element that detected fluorescent

US 10,782,424 B2

INFORMATION PROCESSING DEVICE, RADIATION DETECTOR, RADIATION IMAGING DEVICE, AND PROGRAM

TECHNICAL FIELD

The present invention relates to an information processing device related to gamma (γ) ray detection, a radiation detector, a radiation imaging device, and a program.

BACKGROUND ART

FIG. 24 shows a radiation detector according to a conventional configuration. Such a radiation detector is intended to detect a gamma (γ) ray having relatively high energy, and includes a scintillator 52 for converting a gamma (γ) ray to fluorescence and a SiPM (silicon photomultiplier) 53 for detecting the fluorescence emitted from the scintillator 52. The scintillator 52 is configured by arranging rectangular parallelepiped scintillator crystals. On the other hand, the SiPM 53 is configured by arranging detection elements for detecting fluorescence. A radiation detector of a conventional structure is detailed in Patent Document 1 and Patent Document 2.

In the example shown in FIG. 24, the scintillator crystal and the detection element correspond one to one. In a conventional radiation detector, the fluorescence generated from the scintillator 52 is detected by one of the detection elements. The radiation detector is configured to distinguish which detection element detected fluorescence. With this, it is possible to distinguish which crystal generated fluorescence. This is because the fluorescence is generated by a scintillator crystal corresponding to the detection element related to the detection.

Such a radiation detector is configured to output the time of occurrence of the detected fluorescence. As a method of specifying the time of occurrence of fluorescence, two methods as shown in FIG. 25 are known. The left side in FIG. 25 shows a first method of calculating the time of occurrence of fluorescence with only the output of the element that detected fluorescence. In the case of the left side in FIG. 25, the fluorescence generated from the scintillator crystal indicated by shading is detected by the element corresponding to this scintillator crystal. Actually, not limited to this element, all the elements keep outputting a signal indicating the input condition of fluorescence. The calculation of the time of occurrence is performed based on the output of one element related to the detection of fluorescence among these elements, and the outputs of the other elements are not taken into consideration in calculation.

The right side in FIG. 25 shows a second method of calculating the time of occurrence of fluorescence with the outputs of all the elements. Also in the case of the right side in FIG. 25, the fluorescence generated from the scintillator crystal indicated by shading is detected by the element corresponding to this scintillator crystal. Also in this case, all the elements keep outputting a signal indicating the input condition of fluorescence. In the case of the left side in FIG. 25, all the signals are added into a single added signal. The calculation of the time of occurrence is performed based on this added signal, and the outputs of all the elements are considered in calculation. However, elements other than the element related to the detection of fluorescence each emit only a signal indicating that the fluorescence input is zero (0). As a result, the calculation of the time of occurrence will be performed based on the output of one element related to the detection of fluorescence among these elements.

A conventional radiation detector is designed to calculate the time of occurrence of fluorescence in either one of these two methods.

PRIOR ART

Patent Document

Patent Document 1: Japanese Unexamined Patent Application Publication No. 2011-059099
Patent Document 2: Japanese Unexamined Patent Application Publication No. 11-72566

SUMMARY OF THE INVENTION

Problems to be Solved by the Invention

However, a radiation detector of a conventional configuration lacks consideration for the fact that the time of occurrence of fluorescence is inaccurate due to two causes, i.e., a multiple scattering event and an S/N ratio. As a result, it is not configured to accurately calculate the time of occurrence of fluorescence.

The first method is disadvantageous in the case of a multiple scattering event. First, a multiple scattering event will be described. FIG. 26 illustrates normal fluorescence. That is, a gamma (γ) ray incident on the scintillator 52 is entirely converted into fluorescence at the inside of any one of the scintillator crystals. The fluorescence generated at this time is detected only by the element corresponding to the scintillator crystal. The signal output from this element is strong. This is because the fluorescence concentrates in a single element. Such a detection of fluorescence is called "photoelectric absorption event", but for convenience of description, it will be referred to as "single event".

FIG. 27 illustrates a multiple scattering event. The gamma (γ) ray of this case enters the scintillator 52 and then is partially converted to fluorescence with a scintillator crystal. A part of the gamma (γ) ray survives without being converted to fluorescence and flies towards the adjacent scintillator crystal. After that, the surviving gamma (γ) ray is converted into fluorescence by the adjacent scintillator crystal. The two generated fluorescence are detected by different elements. Such detection of fluorescence is called a multiple scattering event, but for convenience of description, it will be referred to as "multiple event".

In the case of FIG. 27, both of the two generated fluorescence are light energy partially converted from gamma (γ) ray energy. Therefore, each of these fluorescence is weaker than the fluorescence shown in FIG. 26 which is generated by converting all energy of a gamma (γ) ray into light energy. These two weak light are detected by two mutually different elements. In the case of the first method explained with reference to the left side in FIG. 25, the time of occurrence of fluorescence is calculated using only one of the outputs of the two elements. That is, when a multiple event occurs, the time of occurrence of fluorescence must be calculated with detection signals weaker compared with a detection signal in a single event.

When calculating the time of occurrence of fluorescence, the strength of the detection signal is important. When fluorescence is generated in a scintillator crystal, the crystal that did not shine at all becomes gradually brighter at one time, and then becomes gradually darker. The detection signal output from the element also indicates this behavior. The signal gradually becomes stronger, and then becomes gradually weaker.

In the radiation detector, the determination of the time of occurrence of fluorescence is made based on whether or not the detection signal that gradually increases in strength exceeds a threshold value. Therefore, the time of occurrence of fluorescence becomes more accurate as the rising edge of the detection signal becomes steeper as shown on the left side in FIG. 28. However, when the detection signal is weak, the rising edge of the signal becomes gentler as shown on the right side in FIG. 28, which results in a delayed estimate of the time of occurrence of fluorescence.

The second method is disadvantageous from the viewpoint of an S/N ratio. In the second method, the time of occurrence of fluorescence is calculated based on an added signal obtained by adding output signals of all the elements. Since most of the elements other than the elements related to the fluorescence detection keep outputting a signal indicating that the fluorescence input is 0 (zero), the added signal should contain only the signal components showing the transition of fluorescence intensity. However, the added signal contains noise output by the element in addition to the signal components. The noise component contained in the added signal is a combination of noise output simultaneously by all the elements on the SiPM 53 and is considerably large.

When calculating the time of occurrence of fluorescence, the S/N ratio of the detection signal is important. The determination of the time of occurrence of fluorescence is made based on whether or not the added signal exceeds a certain threshold value. Therefore, when the noise component of the added signal is lesser, the time of occurrence of fluorescence can be calculated more accurately.

As described above, both the first method and the second method cannot calculate the time of occurrence of fluorescence sufficiently accurately for different reasons. The first method is disadvantageous from the viewpoint of a multiple scattering event, and the second method is disadvantageous from the viewpoint of a S/N ratio.

The present invention was made in view of such circumstances, and an object of the present invention is to provide a radiation detector capable of accurately calculating the time of occurrence of fluorescence.

Means for Solving the Problems

In order to solve the aforementioned problems, the present invention has the following configuration.

That is, the information processing device according to the present invention is equipped with:

a scintillator including scintillator crystals arranged in a matrix to convert radiation into fluorescence and a reflection plate for optically isolating adjacent scintillator crystals; and a light detector configured to include a plurality of detection elements each for detecting fluorescence to output a detection signal and optically coupled to the scintillator, wherein the information processing device is configured to be provided to a radiation detector configured to detect fluorescence emitted from one scintillator crystal by one detection element corresponding to the scintillator crystal, characterized in that the information processing device comprising:

duplication means configured to duplicate the detection signal output from each detection element;

single event processing means configured to calculate a single signal time which is a time of occurrence of fluorescence based on the detection signal derived from one detection element related to the detection of fluorescence among duplicated detection signals;

multiple event processing means configured to calculate an added signal time which is the time of occurrence of fluorescence based on an added signal generated by adding duplicate detected signals;

detection element recognition means configured to identify the detection element that detected the fluorescence among the detection elements provided in the light detector based on each duplicated duplicated detection signal; and output switching means configured to output the single signal time as the time of occurrence of fluorescence when the number of the detection elements related to fluorescence detection is 1, and output the added signal time as the time of occurrence when the number of the detection elements related to fluorescence detection is plural.

[Functions/Effects] The information processing device according to the present invention has a configuration capable of accurately calculating the time of occurrence of fluorescence. In the radiation detector according to the present invention, the fluorescence emitted from one scintillator crystal is detected by one detection element corresponding to the scintillator crystal. Therefore, the time of occurrence of fluorescence is calculated based on the detection signal derived from one detection element related to the detection of fluorescence. The time calculated at this time is referred to as "single signal time".

In addition to a configuration that calculates a single signal time, in view of the case in which a multiple event occurs, the present invention also has a configuration in which the time of occurrence of fluorescence is calculated on the basis of an added signal generated by adding detection signals. The time calculated at this time is referred to as "added signal time".

The radiation detector according to the present invention is configured to output a single signal time as the time of occurrence of fluorescence when the number of detection elements related to the fluorescence detection is 1 (in the case of a single event). In the case of a single event, from the viewpoint of superimposition of noise by the addition of signals, the single signal time is more accurate than the added signal time.

Further, the radiation detector according to the present invention is configured to output an added signal time as the time of occurrence of fluorescence when the number of detection elements related to the fluorescence detection is plural (in the case of a multiple event). In the case of a multiple event, from the viewpoint of strengthening of a signal by adding signals, an added signal time is more accurate than a single signal time.

As described above, according to the present invention, the time of occurrence of fluorescence can be calculated by the optimal method according to the occurrence situation of fluorescence.

Further, in the aforementioned information processing device, it is preferable that the multiple event processing means calculate the added signal time by the added signal calculated based on all of the detection elements of the light detector.

[Functions and Effects] The aforementioned configuration shows a more specific configuration of the present invention. By generating an added signal based on all the detection elements of the light detector, it is possible to reliably execute the strengthening of the signal by adding signals.

Further, in the aforementioned information processing device, it is preferable that the multiple event processing means calculate the added signal time by the added signal calculated based on some of the detection elements of the light detector.

[Functions and Effects] The aforementioned configuration shows a more specific configuration of the present invention. By generating an added signal based on some of the detection elements of the light detector, it is possible to generate an added signal while suppressing superposition of noise as much as possible.

Further, in the aforementioned information processing device, it is more preferable that the multiple event processing means calculates the added signal time for each region formed by dividing a detection element array in which the detection elements in the light detector are arranged according to a certain division, and the output switching means outputs, when the number of detection elements related to the fluorescence detection is plural, the added signal time derived from the region including all of the detection elements related to the fluorescence detection among the added signal times as the time of occurrence of fluorescence.

[Functions and Effects] The aforementioned configuration shows a more specific configuration of the present invention. By configuring as described above, the added signal time output as the time of occurrence of fluorescence is derived from the region including all of the detection elements related to the fluorescence detection. By doing like this, it is possible to calculate the added signal time by adding the signal components output from the different detection elements due to the occurrence of a multiple event without missing them while suppressing the noise component of the added signal by adding some of the detection elements.

Further, in the aforementioned information processing device, it is more preferable that the multiple event processing means be configured to calculate the added signal time for each region formed by dividing the detection element array with a plurality of divisions and a boundary line related to a certain division and a division boundary line related to another division do not pass between the same pair of detection elements.

[Functions and Effects] The aforementioned configuration shows a more specific configuration of the present invention. If there is only one division pattern for the detection element array in which detection elements are arranged, a multiple event may occur across different regions in which a multiple event occurs. If a division is generated with a plurality of patterns as described above, all detection elements that detected fluorescence related to a multiple event belong to the region defined by any of these divisions.

Further, in the aforementioned radiation detector, it may be configured such that the detection element and the scintillator crystal are optically coupled in a one-to-one correspondence.

Further, in the aforementioned radiation detector, it may be configured such that the detection element is constituted by a plurality of detection element fragments capable of independently detecting fluorescence.

Further, in the aforementioned radiation detector, it may be configured such that a light guide for optically coupling the scintillator and the light detector is provided.

[Functions/Effects] As described above, the present invention can be applied to various radiation detectors.

Effects of the Invention

The radiation detector according to the present invention is configured to accurately calculate the time of occurrence of fluorescence. In addition to a configuration in which a single signal time is calculated, in view of the case in which a multiple event occurs, the present invention also has a configuration in which the time of occurrence (added signal time) of fluorescence is calculated on the basis of an added signal generated by adding detection signals. Further, the radiation detector according to the present invention is configured to output an added signal time as the time of occurrence of fluorescence when the number of detection elements related to the fluorescence detection is plural (in the case of a multiple event). In the case of a multiple event, from the viewpoint of signal strengthening by adding signals, an added signal time is more accurate than a single signal time.

EMBODIMENTS FOR CARRYING OUT THE INVENTION

Hereinafter, an embodiment of a radiation imaging device according to the present invention will be described with reference to the attached drawings. Note that a gamma ($\gamma$) ray corresponds to a radiation of the present invention.

Embodiment 1

<Overall Configuration of Radiation Detector>

Figure 1:
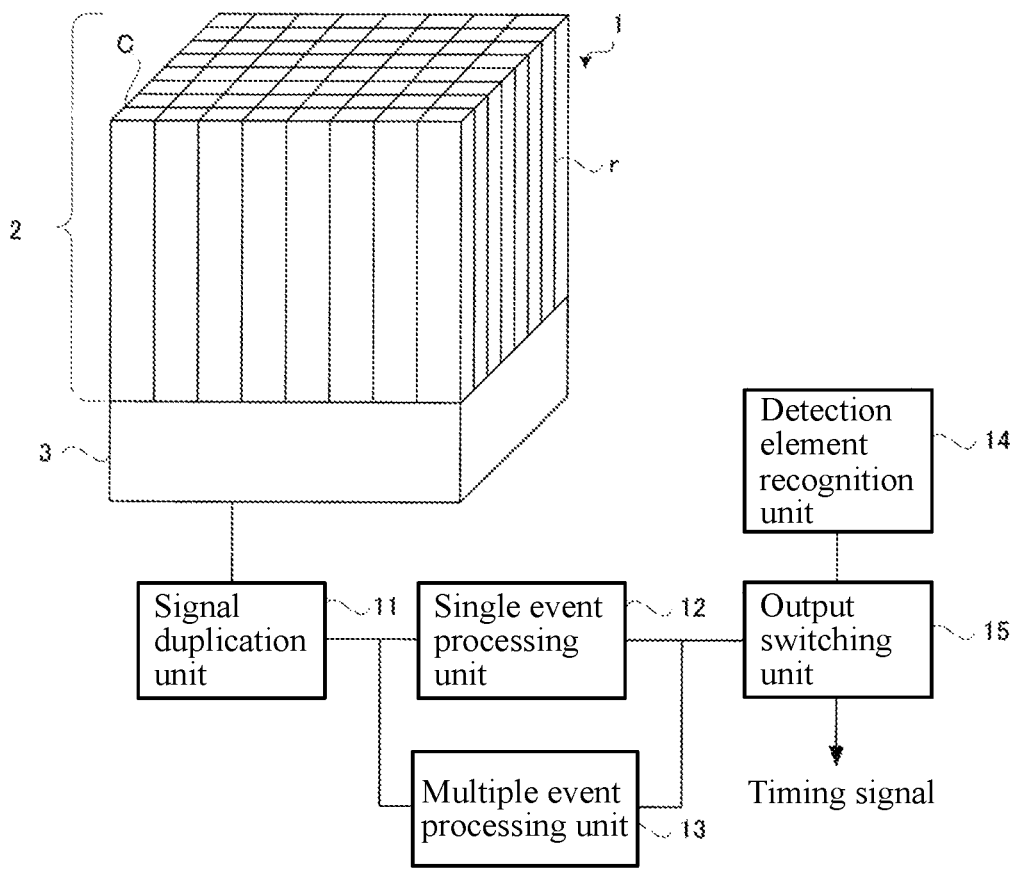
FIG. 1 is a functional block diagram illustrating an overall configuration of a radiation detector according to Embodiment 1.

As shown in FIG. 1, a radiation detector 1 according to the present invention is provided with a scintillator 2 in which scintillator crystals C for converting a gamma ($\gamma$) ray into fluorescence are integrally arranged in a matrix and a SiPM 3 provided on a lower surface of the scintillator 2 to detect the fluorescence generated by the scintillator 2. The scintillator 2 shown in FIG. 1 includes a total of 64 scintillator crystals C elongated in the height direction and arranged in a two-dimensional 8×8 matrix. The SiPM corresponds to the light detector of the present invention.

The scintillator crystal C is made of LGSO $(Lu, Gd)_2 SiO_5$ containing a cerium element, and has characteristics of emitting fluorescence when a gamma ($\gamma$) ray is incident. In place of the LGSO, the scintillator crystal C may be made of other materials, such as, e.g., GSO ($Gd_2SiO_5$). The scintillator crystal C converts a gamma ($\gamma$) ray into fluorescence.

Scintillator crystals C arranged adjacent to each other are coupled via a reflector r that reflects fluorescence and are integrated to form the scintillator 2. The scintillator crystals C arranged adjacent to each other are optically isolated from each other by the reflector r. The fluorescence generated by the scintillator crystal C is reflected by the reflection plate r covering the crystal side surface and cannot proceed to the adjacent scintillator crystal C and exits toward the SiPM 3. In this way, the scintillator 2 is provided with scintillator crystals C arranged in a matrix to convert a gamma ($\gamma$) ray into fluorescence and a reflector r for optically isolating the scintillator crystals arranged adjacent.

Figure 2:
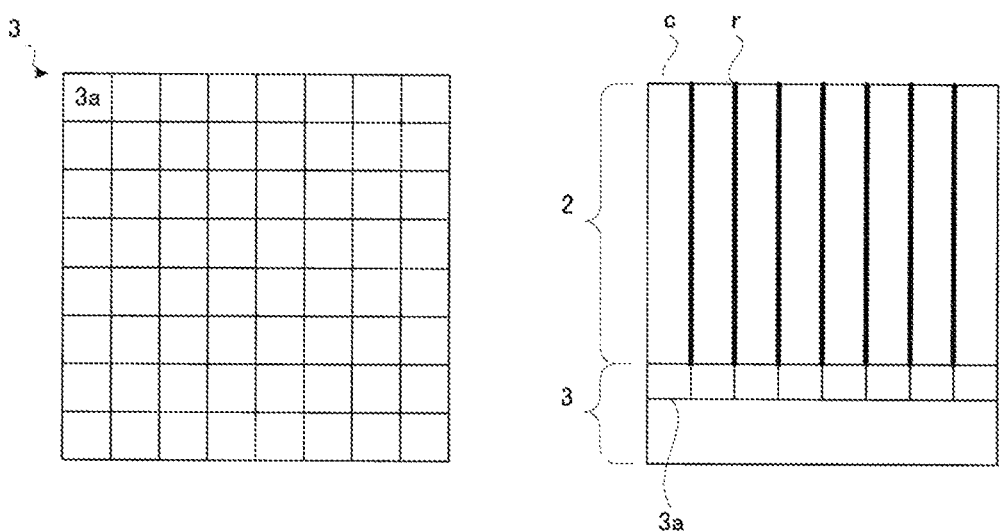
FIG. 2 is a schematic diagram illustrating the configuration of the radiation detector according to Embodiment 1.

As shown on the left side in FIG. 2, the SiPM 3 is provided with a plurality of detection elements 3a. The detection element 3a is an optical sensor that detects fluorescence emitted by the scintillator 2. In the SiPM 3, detection elements 3a are arranged in a two-dimensional matrix of 8×8, and a total of 64 detection elements 3a are provided. The SiPM 3 is configured such that detection elements 3a for detecting fluorescence are arranged and fluorescence generated in the scintillator crystal C is detected by a plurality of detection elements 3a. The SiPM 3 is configured to include a plurality of detection elements 3a for detecting fluorescence to output a detection signal, and is optically coupled to the scintillator 2.

The right side in FIG. 2 shows how the scintillator 2 and the SiPM 3 are optically coupled. As shown on the right side in FIG. 2, the array pitch of crystals in the scintillator 2 and the array pitch of detection elements 3a in the SiPM 3 coincide with each other. Therefore, the scintillator crystal C constituting the scintillator 2 is optically coupled to the detection element 3a one to one. When fluorescence is generated from such a scintillator crystal C, fluorescence is detected by only one detection element 3a optically coupled to the scintillator crystal C. All of fluorescence generated by the scintillator crystal C are detected by a single detection element 3a. The fluorescence emitted from one scintillator crystal C is detected by one detection element 3a corresponding to the scintillator crystal C.

A signal duplication unit 11, a single event processing unit 12, a multiple event processing unit 13, a detection element recognition unit 14, an output switching unit 15 are configured to cooperate with each other to calculate the time at which the scintillator 2 generates fluorescence. The time indicated by the timing signal output from the output switching unit 15 is the time of occurrence of fluorescence, which also indicates the time when the gamma ($\gamma$) ray enters the scintillator 2. Such a timing signal is used to execute coincidence counting related to an annihilation gamma ($\gamma$) ray in a positron emission tomography apparatus.

The signal duplication unit 11 corresponds to the duplication means of the present invention, and the single event processing unit 12 corresponds to the single event processing means of the present invention. The multiple event processing unit 13 corresponds to the multiple event processing means of the present invention, and the detection element recognition unit 14 corresponds to the detection element recognition means of the present invention. The output switching unit 15 corresponds to the output switching means of the present invention.

The detection element 3a outputs a detection signal individually. Therefore, the output terminal of the SiPM 3 has the same number of 64 channels as the number of detection elements 3a. The detection signal from the output terminal of the detection element 3a is sent to the signal duplication unit 11. The signal duplication unit 11 duplicates the output of the SiPM 3 to generate a duplicate signal. The output terminal of the duplicate signal is composed of 64 channels in the same manner as the output of the SiPM 3. One of the duplicate signals is input to the single event processing unit 12, and the other is input to the multiple event processing unit 13. In this way, the same signal is input to the single event processing unit 12 and the multiple event processing unit 13. The signal duplication unit 11 duplicates the detection signal output from each detection element 3a.

<Single Event Processing Unit 12 and Multiple Event Processing Unit 13>

Figure 3:
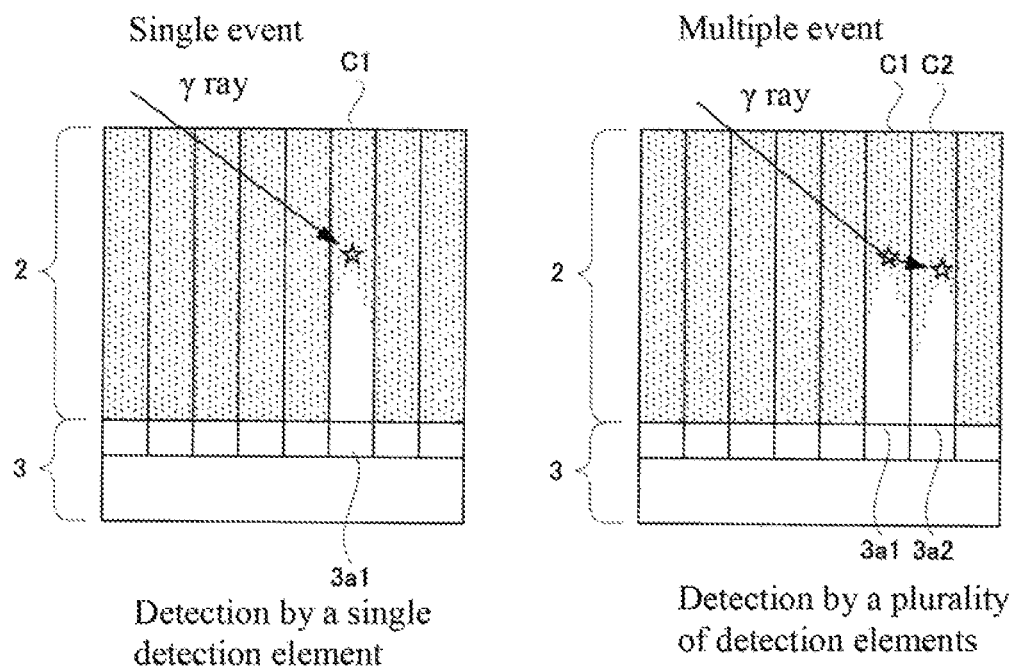
FIG. 3 is a schematic diagram showing how fluorescence is generated by the radiation detector according to Embodiment 1.

The single event processing unit 12 is configured to calculate the time of occurrence of fluorescence on the premise that fluorescence is a single event as shown on the left side in FIG. 3. In the case of a single event, a gamma ($\gamma$) ray incident on the scintillator 2 is converted to fluorescence by a certain scintillator crystal C1, and the generated fluorescence is prevented by the reflection plate r (see FIG. 2) from being leaked to the adjacent scintillator crystal. Further, scintillator crystals other than the scintillator crystal C1 do not emit fluorescence. The fluorescence generated at this time is detected only by the detection element 3a1 corresponding to the scintillator crystal C1, and other detection elements do not detect the fluorescence.

The multiple event processing unit 13 is configured to calculate the time of occurrence of fluorescence on the premise that fluorescence is a multiple event as shown on the right side in FIG. 3. In the case of a multiple event, a part of the gamma ($\gamma$) ray incident on the scintillator 2 is converted to fluorescence by a certain scintillator crystal C1, and a part of the gamma ($\gamma$) ray not converted to fluorescence enters the adjacent scintillator crystal C2 and will be converted to fluorescence. At this time, the reflection plate r cannot shield the gamma (γ) ray, unlike fluorescence. The fluorescence generated in the scintillator crystal C1 is detected only by the detection element 3a1 corresponding to the scintillator crystal C1, and the fluorescence generated in the scintillator crystal C2 is detected only by the detection element 3a2 corresponding to the scintillator crystal C2. The fluorescence related to a multiple event is detected by the detection elements 3a1 and 3a2 which are arranged adjacent to each other.

The fluorescence generated by the scintillator 2 is either a single event or a multiple event. In the case of the present invention, it is configured as follows. When fluorescence is a single event, the time calculated by the single event processing unit 12 is defined as the time of occurrence of fluorescence, and when fluorescence is a multiple event, the time calculated by the multiple event processing unit 13 is the time of occurrence of fluorescence. The output switching unit 15 decides which output of the processing units 12 and 13 is adopted as the time of occurrence of fluorescence. In the case of a single event, the output switching unit 15 sets the time calculated by the single event processing unit 12 as the time of occurrence of fluorescence, and in the case of a multiple event, the output switching unit 15 sets the time calculated by the multiple event processing unit 13 as the time of occurrence of fluorescence. The specific operation of the output switching unit 15 will be described later.

<Specific Structure of Single Event Processing Unit 12>

Figure 4:
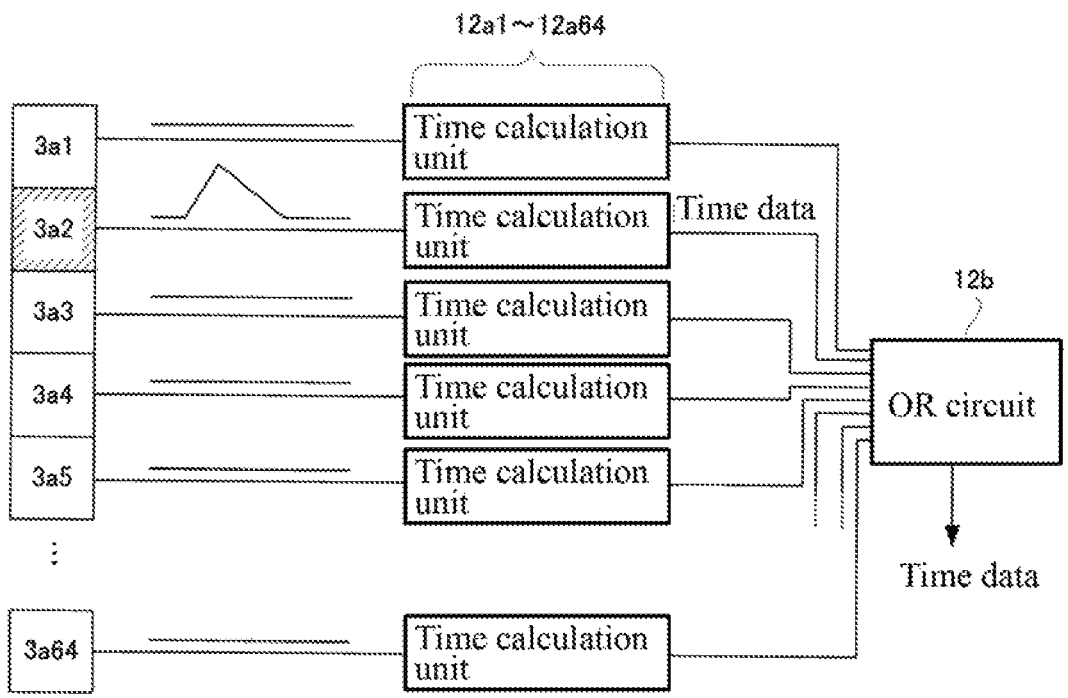
FIG. 4 is a functional block diagram illustrating a single event processing unit according to Embodiment 1.

FIG. 4 shows the time calculation units 12a1 to 12a64 and an OR circuit 12b, which constitute the single event processing unit 12. In FIG. 4, note that the signal duplication units 11 interposed between each detection element 3a1 to 3a64 and the single event processing unit 12 are omitted. The time calculation units 12a1 to 12a64 are individually provided for each of the detection elements 3a1 to 3a64, and individually monitors whether or not each detection element 3a detected fluorescence.

Figure 5:
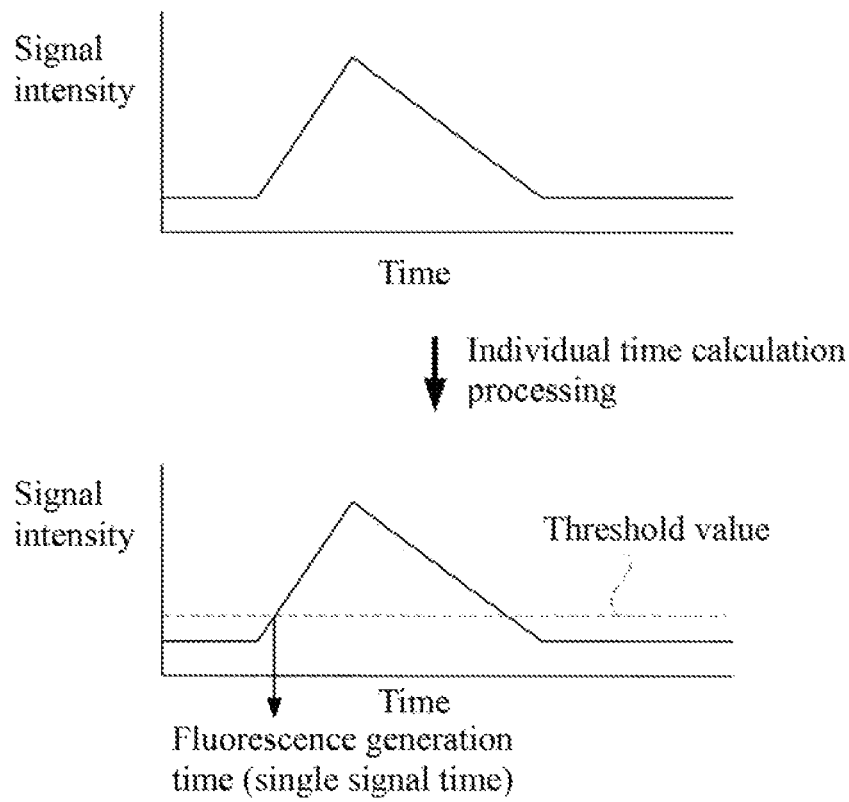
FIG. 5 is a schematic diagram illustrating an operation of a single event processing unit according to Embodiment 1.
Figure 27:
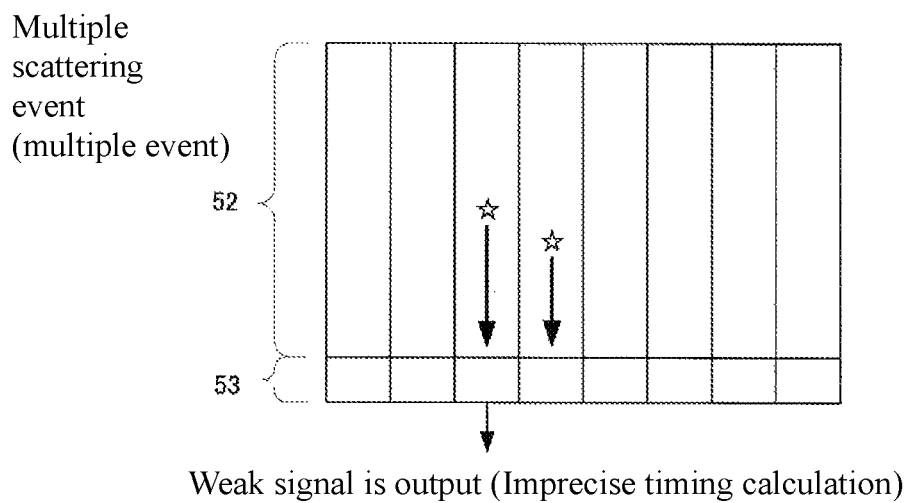
FIG. 27 is a schematic diagram illustrating a problem of the conventional radiation detector.
Figure 28:
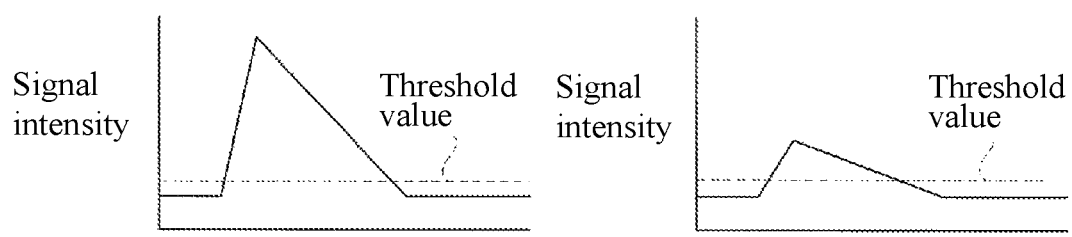
FIG. 28 is a schematic diagram illustrating a problem of the conventional radiation detector.

FIG. 5 shows the operation of the time calculation unit 12a. The detection element 3a keeps outputting a signal indicating that fluorescence detection is zero (0) to the time calculation unit 12a even when fluorescence is not detected. The time calculation unit 12a keeps monitoring whether or not the signal exceeds a certain threshold value. Upon detection of fluorescence, the detection element 3a outputs a signal having a time course like a triangular wave shown in the upper portion in FIG. 5. Such a signal will be input to the time calculation unit 12a. At this time, the signal will exceed the set threshold value. The time calculation unit 12a outputs the time when the signal has reached the threshold value as the time of occurrence of fluorescence. However, this time of occurrence of fluorescence is accurate only when the fluorescence is a single event, and may not be accurate when the fluorescence is a multiple event. This situation has already been described with reference to FIG. 27.

The OR circuit 12b is configured to receive the outputs of the time calculation units 12a1 to 12a64 and allow to pass a timing-related signal when one of the time calculation units 12a1 to 12a64 outputs the timing-related signal. By the OR circuit 12b, the outputs of the SiPM 3 having 64 channels are put together into a signal line of 1 channel.

FIG. 4 shows the case in which the detection element 3a2 detects fluorescence related to a single event. The detection element 3a2 transmits a signal related to fluorescence detection to the time calculation unit 12a2 connected thereto, and the time calculation unit 12a2 generates time data indicating the time of occurrence of fluorescence based on the signal and transmits it to the OR circuit 12b. The OR circuit 12b passes the transmitted time data to the output side. The output of the OR circuit 12b becomes an output of the single event processing unit 12. This output indicates the time of occurrence of fluorescence, but it is uncertain at this time whether or not the output is adopted by the output switching unit 15. Therefore, it will be referred to as a single signal time. The single event processing unit 12 calculates a single signal time which is the time of occurrence of fluorescence based on a detection signal derived from one detection element 3a related to the detection of fluorescence among duplicated detection signals.

<Specific Structure of Multiple Event Processing Unit 13>

Figure 6:
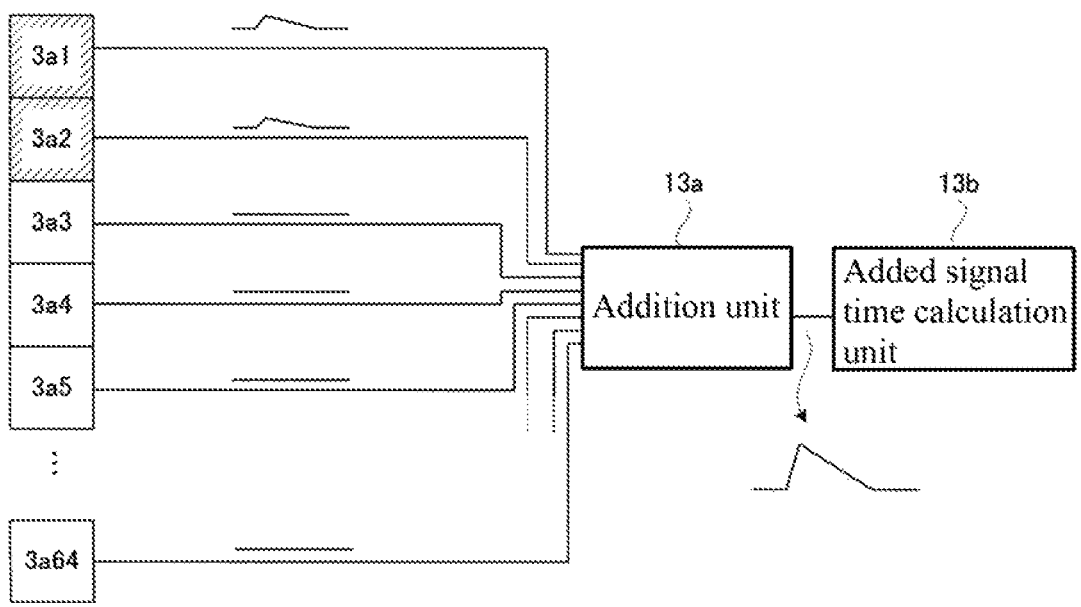
FIG. 6 is a functional block diagram illustrating a multiple event processing unit according to Embodiment 1.

FIG. 6 shows an addition unit 13a and an added signal time calculation unit 13b which constitute the multiple event processing unit 13. In FIG. 6, note that the signal duplication units 11 interposed between each detection element 3a1 to 3a64 and the multiple event processing unit 13 are omitted. The addition unit 13a adds the outputs of respective detection elements 3a1 to 3a64 and outputs an added signal. By the addition unit 13a, the outputs of the SiPM 3 having 64 channels are put together into a signal line of 1 channel.

The added signal is sent to the added signal time calculation unit 13b. The operation of the added signal time calculation unit 13b is similar to the operation of the time calculation units 12a1 to 12a64 described with reference to FIG. 5.

Figure 7:
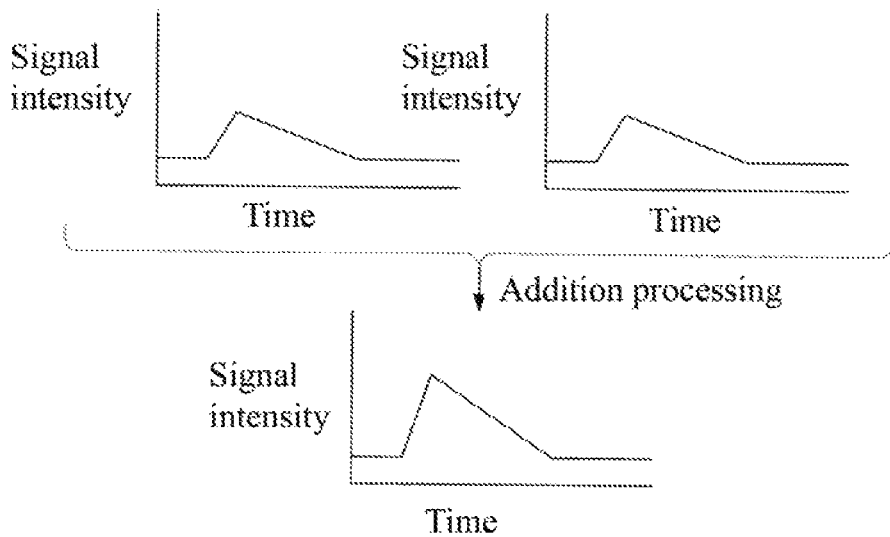
FIG. 7 is a functional block diagram illustrating the multiple event processing unit according to Embodiment 1.

FIG. 6 shows the case in which the detection elements 3a1 and the detection element 3a2 detected fluorescence related to a multiple event. The output signals of the detection element 3a1 and the detection element 3a2 are weak. This is because the fluorescence detected by these detection elements is weak fluorescence generated by a gamma (γ) ray split into two routes. However, the output signals of the detection element 3a1 and the detection element 3a2 are added by the addition unit 13a as shown in FIG. 7, so that the signal intensity becomes the same level as that of the fluorescence detection at a single event. The added signal time calculation unit 13b calculates the time of occurrence of fluorescence based on such a strong added signal.

The signal related to the time of occurrence output from the added signal time calculation unit 13b becomes an output of the multiple event processing unit 13. This output indicates the time of occurrence of fluorescence, but it is uncertain at this time whether or not the output is adopted by the output switching unit 15. Therefore, it will be temporarily referred to as "added signal time". The multiple event processing unit 13 calculates the added signal time which is the time of occurrence of fluorescence based on the added signal generated by adding duplicated detection signals. The addition unit 13a of the multiple event processing unit 13 generates an added signal based on all of the detection elements 3a included in the SiPM 3.

Figure 8:
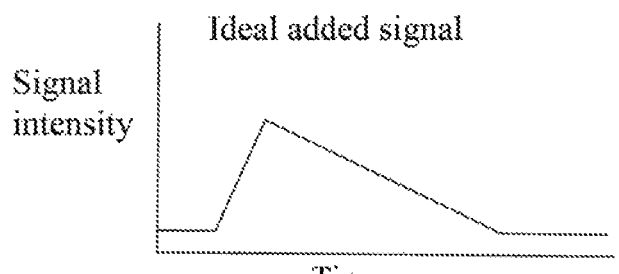
FIG. 8 is a functional block diagram illustrating the problem of the multiple event processing unit according to Embodiment 1.

The added signal contains much noise, which will be explained. FIG. 8 shows an ideal added signal that should be generated when each detection element 3a1 to 3a64 does not output noise. This added signal does not include a noise component and is not inferior to the output signal of the detection element 3a that detected fluorescence related to a single event.

Figure 9:
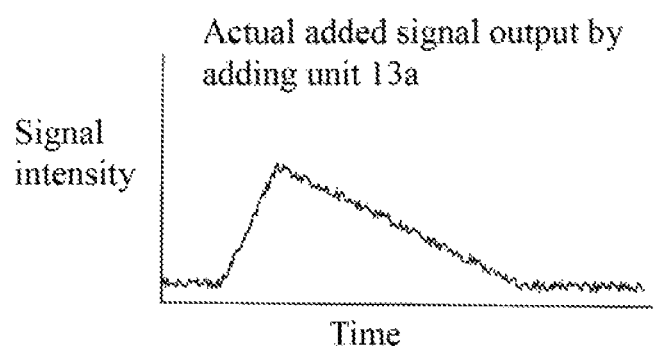
FIG. 9 is a functional block diagram illustrating the problem of the multiple event processing unit according to Embodiment 1.

However, in reality, each detection element 3a1 to 3a64 outputs noise. When the addition unit 13a performs addition processing, it also adds the noise component of 64 channels and superimposes it on the added signal. Therefore, the actual added signal contains considerably strong noise as shown in FIG. 9.

When fluorescence is a multiple event, the reliability of the added signal time becomes higher than that of the single signal time. This is because the single event processing unit 12 can calculate the time of occurrence of fluorescence only based on the weak fluorescence intensity, while the multiple event processing unit 13 can calculate the added signal time by increasing the signal intensity by adding the signals related to the weak fluorescence intensity.

However, when fluorescence is a single event, the reliability of the added signal time is inferior to the single signal time. This is because, in the multiple event processing unit 13, superposition of noise which cannot occur in the single event processing unit 12 occurs. Therefore, it is necessary to switch which processing unit 12, 13 output is adopted depending on the type of event. It is the output switching unit 15 that carries out this switching. The output switching unit 15 operates by recognizing which event the fluorescence was caused by the detection element recognition unit 14.

<Detection Element Recognition Unit 14>

Figure 10:
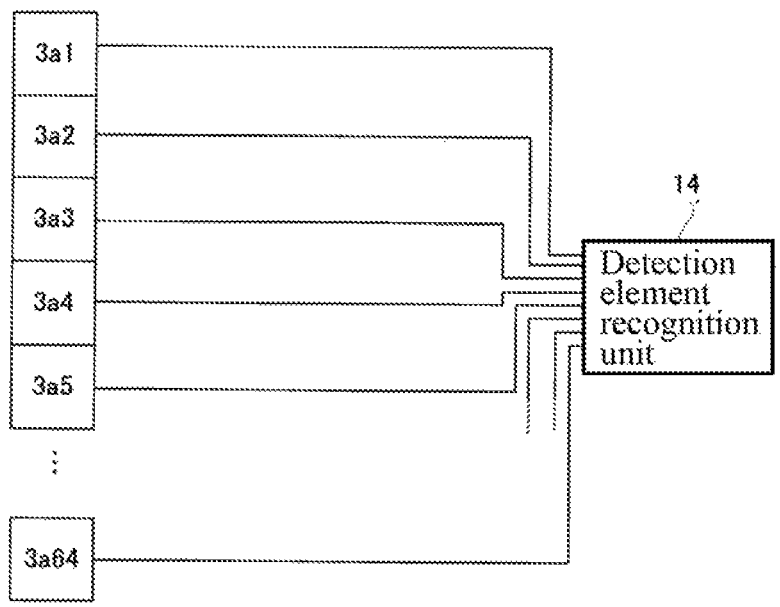
FIG. 10 is a functional block diagram illustrating a detection element recognition unit according to Embodiment 1.

FIG. 10 specifically explains the detection element recognition unit 14. To the detection element recognition unit 14, signals from respective detection elements 3a1 to 3a64 are input. The input signal may be a detection signal duplicated by the signal duplication unit 11 or may be the outputs of the time calculation units 12a1 to 12a64 shown in FIG. 4. In FIG. 10, note that the signal duplication unit 11 or the time calculation units 12a1 to 12a64 interposed between each detection element 3a1 to 3a64 and the detection element recognition unit 14 are omitted.

The detection element recognition unit 14 can recognize which of the detection elements 3a1 to 3a64 is the detection element that issued the fluorescence detection signal. According to this detection element recognition unit 14, it is possible to know which scintillator crystal C constituting the scintillator 2 is the generation source of fluorescence generated in the scintillator 2. This is because the detection element and the scintillator crystal C correspond one-to-one. The detection element recognition unit 14 identifies a detection element that detected the fluorescence among detection elements 3a provided in the SiPM 3 based on each duplicated detection signal.

If the fluorescence generated in the scintillator 2 is related to a single event as described in FIG. 4, the scintillator crystal that emitted the fluorescence is only 1, and the detection element that issued the detection signal of the fluorescence is also 1. Therefore, in this case, the detection element recognition unit 14 recognizes only one detection element as being related to the fluorescence detection. On the other hand, if the fluorescence generated in the scintillator 2 is related to a multiple event, the scintillator crystal that emitted the fluorescence is plural, and the detection elements that issued the detection signal of the fluorescence are also plural. Therefore, in this case, the detection element recognition unit 14 recognizes a plurality of detection elements as being related to the fluorescence detection. In other words, depending on how many detection elements are recognized by the detection element recognition unit 14 as being related to the detection of fluorescence, it is possible to determine that a fluorescence event occurred in the scintillator 2 is related to which of a single event or a multiple event.

<Output Switching Unit 15>

Based on such a principle, the output switching unit 15 is configured to output either the single signal time or the added signal time as the time of occurrence of fluorescence. It is configured such that a signal is input to the output switching unit 15 from the single event processing unit 12, the multiple event processing unit 13, and the detection element recognition unit 14 (see FIG. 1). When fluorescence occurs in the scintillator 2, to the output switching unit 15, a single signal time is input from the single event processing unit 12, an added signal time is input from the multiple event processing unit 13, and a signal indicating the detection element related to the fluorescence detection is input from the detection element recognition unit 14.

Figure 11:
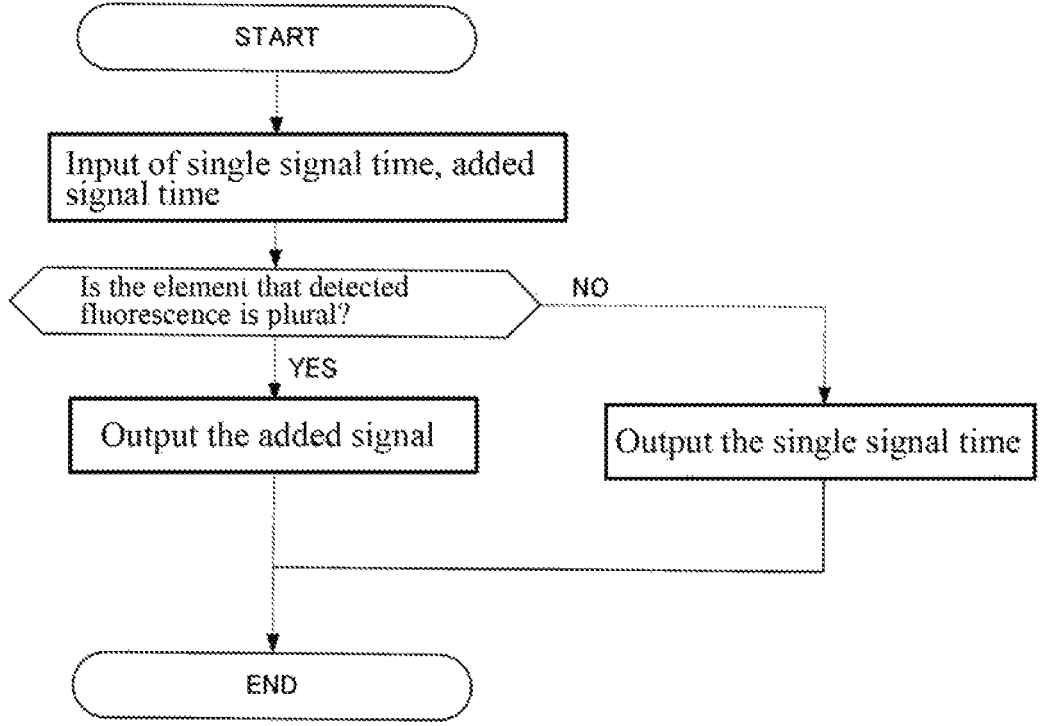
FIG. 11 is a flowchart illustrating an operation of an output switching unit according to Embodiment 1.

Upon receiving a signal from each unit, the output switching unit 15 changes the operation in accordance with the number of detection elements that detected fluorescence, as shown in the flowchart of FIG. 11. When there is a plurality of detection elements that detected fluorescence, the output switching unit 15 outputs the added signal time as the time of occurrence of fluorescence. Further, when the number of detection element that detected fluorescence is only one, the output switching unit 15 outputs the single signal time as the time of occurrence of fluorescence.

Each unit 11, 12, 13, 14, and 15 is realized by a microcomputer mounted on a radiation detector, and constitutes an information processing device. The configuration of each of these units 11, 12, 13, 14, and 15 may be divided and executed by different information processing devices.

As described above, the radiation detector according to the present invention is configured to accurately calculate the time of occurrence of fluorescence. In the radiation detector according to the present invention, the fluorescence emitted from one scintillator crystal C is detected by the detection element 3a corresponding to the scintillator crystal C. Therefore, the time of occurrence of fluorescence is calculated based on the detection signal derived from one detection element 3a related to the detection of fluorescence. The time calculated at this time is the single signal time.

In addition to the configuration that calculates a single signal time, in view of the case in which a multiple event occurs, the present invention also has a configuration in which the time of occurrence of fluorescence is calculated on the basis of an added signal generated by adding detection signals. The time calculated at this time is the added signal time.

The radiation detector according to the present invention is configured to output a single signal time as the time of occurrence of fluorescence when the number of detection elements 3a related to the fluorescence detection is 1 (in the case of a single event). In the case of a single event, from the viewpoint of superimposition of noise by the addition of signals, the single signal time is more accurate than the added signal time.

Further, the radiation detector according to the present invention is configured to output an added signal time as the time of occurrence of fluorescence when the number of detection elements 3a related to the fluorescence detection is plural (in the case of a multiple event). In the case of a multiple event, from the viewpoint of strengthening of a signal addition by the addition of signals, an added signal time is more accurate than a single signal time.

As described above, according to the present invention, the time of occurrence of fluorescence can be calculated by the optimal method in accordance with the occurrence situation of fluorescence.

The present invention is not limited to the aforementioned configuration, and may be executed by modifying as follows.

(1) According to the configuration of Embodiment 1, the multiple event processing unit 13 calculates the added signal time based on the added signal obtained by adding signals of all the detection elements 3a1 to 3a64. However, the present invention is not limited to this configuration. It may be configured such that the added signal time is generated based on the added signal calculated by adding some of the outputs of the detection elements. The addition unit 13a of the multiple event processing unit 13 according to this modified embodiment generates an added signal based on some of the detection elements 3a of the SiPM 3. More specifically, the addition unit 13a calculates an added signal time for each region formed by dividing the detection element array in which the detection elements 3a of the SiPM 3 are arranged according to a certain division. The multiple event processing unit 13 calculates the added signal time for each region formed by dividing the detection element array with a plurality of divisions.

Figure 12:
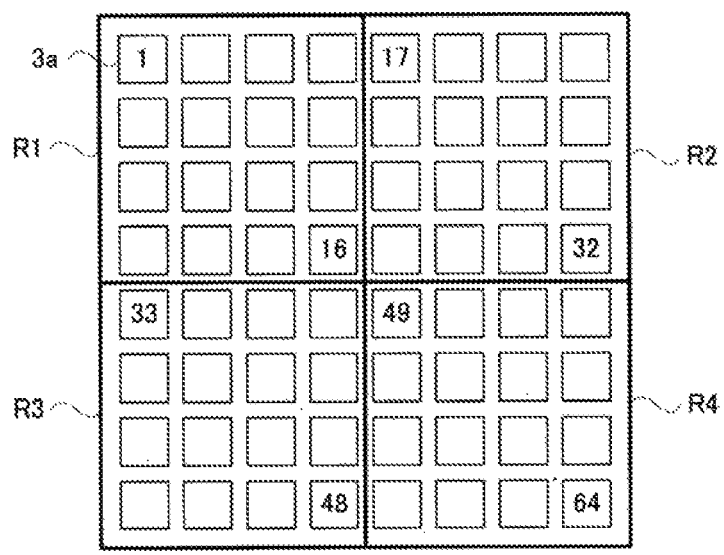
FIG. 12 is a schematic view illustrating one modified embodiment of the present invention.

FIG. 12 shows an example of this modified embodiment. In FIG. 12, the detection surface in which the detection elements 3a1 to 3a64 of the SiPM 3 are arranged is divided into four regions R1, R2, R3, and R4. According to the present invention, it is also possible to divide the arrangement of the detection elements 3a by other division patterns.

In the region R1 in FIG. 12, the detection elements 3a are arranged in a two-dimensional matrix of 4×4. The arrangement of the detection elements 3a is the same for the other regions R2, R3, and R4. Sixteen (16) detection elements 3a provided in the region R1 are referred to as detection elements 3a1 to 3a16, and sixteen (16) detection elements 3a provided in the region R2 will be referred to as detection elements 3a17 to 3a32. In the same manner, sixteen (16) detection elements 3a provided in the region R3 are referred to as detection elements 3a33 to 3a48, and sixteen (16) detection elements 3a provided in the region R4 will be referred to as detection elements 3a49 to 3a64. Note that the division of the arrangement of detection elements 3a shown in FIG. 12 is an example.

Figure 13:
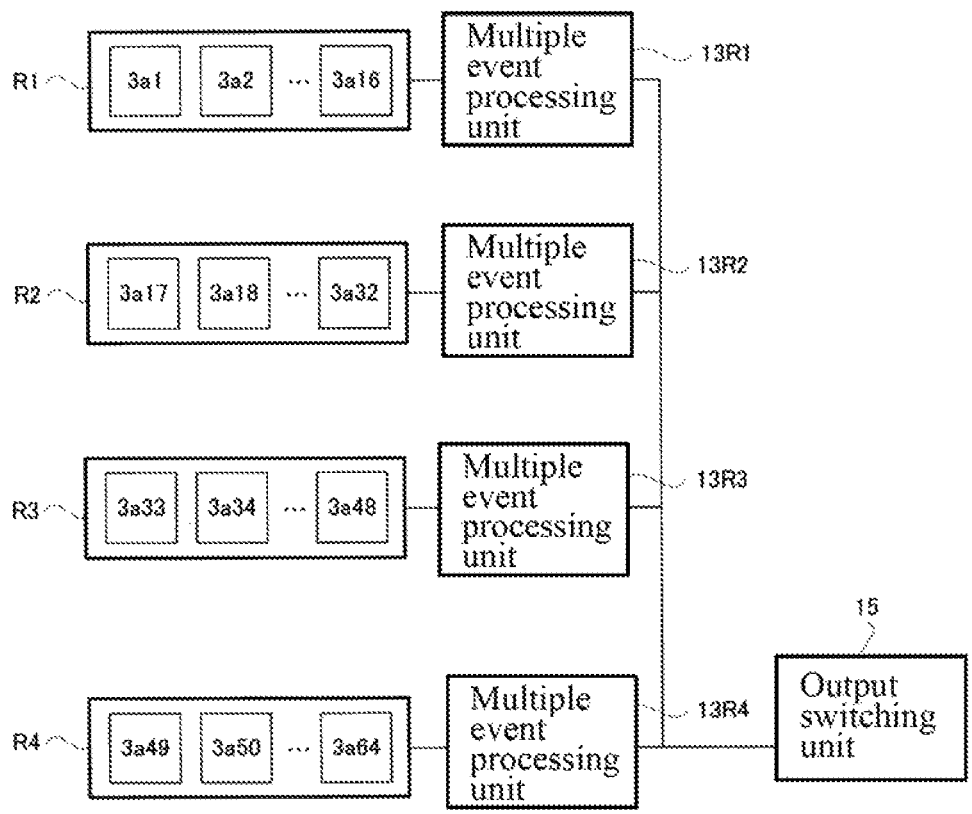
FIG. 13 is a schematic view illustrating one modified embodiment of the present invention.

In the case of this modified embodiment, the added signal time is independently calculated in each region. FIG. 13 explains this situation. The detection elements 3a1 to 3a16 related to the region R1 are connected to the corresponding multiple event processing unit 13R1, and the detection elements 3a17 to 3a32 related to the region R2 are connected to the corresponding multiple event processing unit 13R2. The detection elements 3a33 to 3a48 related to the region R3 are connected to the corresponding multiple event processing unit 13R3, and the detection elements 3a49 to 3a64 related to the region R4 are connected to the corresponding multiple event processing unit 13R4.

The multiple event processing unit 13R1 outputs an added signal time to the output switching unit 15 when fluorescence is detected in the corresponding region R1 and does not output an added signal time to the output switching unit 15 when fluorescence is detected in the other regions R2, R3, and R4. Such a situation can be applied to other multiple event processing units 13R2, 13R3, and 13R4 in the same manner as described above.

The configuration in which the output switching unit 15 outputs either the single signal time and the added signal time as the time of occurrence of fluorescence according to the number of detection elements that detected fluorescence is the same as that in Embodiment 1. When the number of detection elements 3a related to fluorescence detection is 1, the output switching unit 15 outputs a single signal time as the time of occurrence of fluorescence. When the number of detection elements 3a related to the fluorescence detection is plural, the output switching unit 15 outputs detection elements derived from the regions including all of the detection elements 3a related to the fluorescence detection among added signal times as the time of occurrence of fluorescence.

By generating an added signal based on some of the detection elements 3a of the SiPM 3 like in this modified embodiment, it is possible to generate an added signal while suppressing superposition of noise as much as possible. Further, the added signal time output as the time of occurrence of fluorescence according to the this modified embodiment is derived from the region including all of the detection elements 3a related to the fluorescence detection. By doing like this, it is possible to calculate the added signal time by adding the signal components output from detection elements 3a different by the occurrence of a multiple event without missing them while suppressing the noise component of the added signal by adding some of the detection elements 3a.

Figure 14:
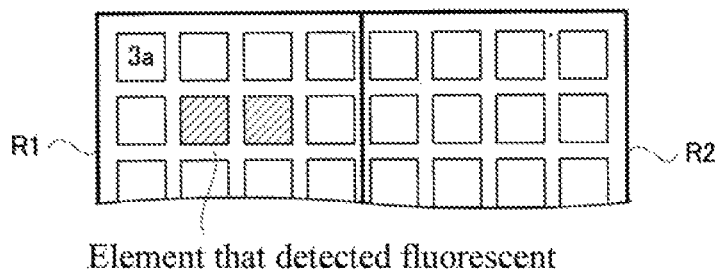
FIG. 14 is a schematic view illustrating one modified embodiment of the present invention.
Figure 15:
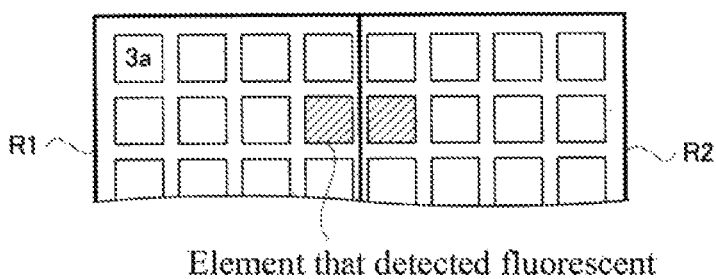
FIG. 15 is a schematic view illustrating one modified embodiment of the present invention.

(2) The above modified embodiment is based on the premise that a multiple event occurs within a single region as shown in FIG. 14. As shown in FIG. 15, when a multiple event occurs across a plurality of regions, the detection signals of the fluorescence output by each detection element are not input to the same multiple event processing unit 13. In this case, since each detection signal is not added, it becomes impossible to obtain such a strong signal as explained with reference to FIG. 7, which affects accurate calculation of the time of occurrence of fluorescence.

Figure 16:
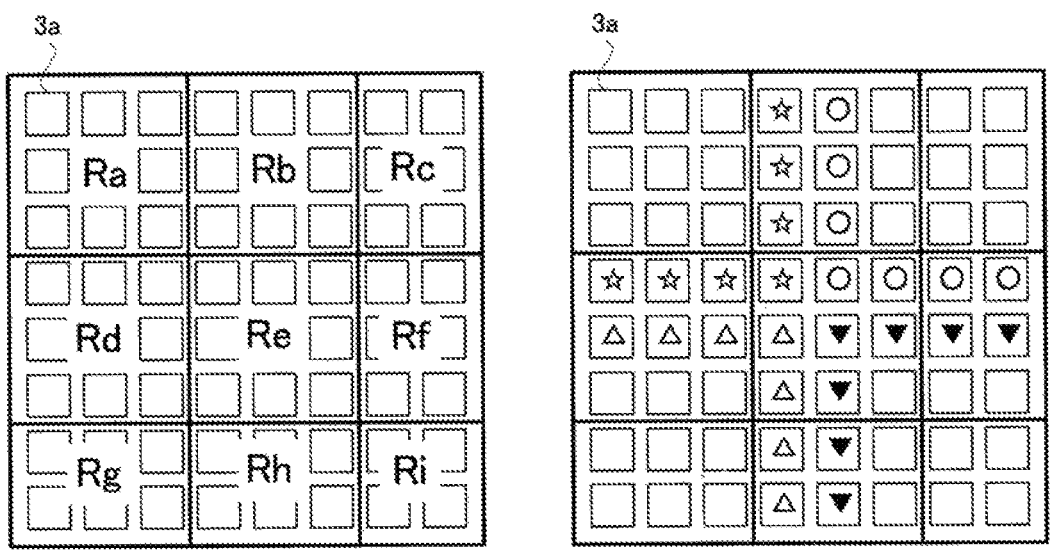
FIG. 16 is a schematic view illustrating one modified embodiment of the present invention.

Therefore, in addition to the modified embodiment explained with reference to FIG. 12, as shown on the left side in FIG. 16, the detection surface of the SiPM 3 may be divided by another pattern different from that shown in FIG. 12. In the case of the left side in FIG. 16, the detection surface in which the detection elements 3a1 to 3a64 of the SiPM 3 are arranged is divided into nine regions Ra to Ri. Nine detection elements 3a belonging to the region Ra are connected to a corresponding multiple event processing unit 13Ra. This connection method can also be applied to other regions Rb to Ri and multiple event processing units 13Rb to 13Ri in the same manner. Note that the division of the arrangement of detection elements 3a shown on the right side in FIG. 16 is an example. According to the present invention, it is also possible to divide the arrangement of the detection elements 3a by other division patterns.

On the right side in FIG. 16, the detection elements with symbols are detection elements located at the end portion of each of the regions R1, R2, R3, and R4 obtained by dividing the detection surface of the SiPM 3 described in FIG. 12 into four. The detection elements indicated by the symbol "☆" are detection elements in the region R1, and show detection elements in contact with a region different from the region R1 to which the detection element belongs. The detection elements indicated by the symbol "○" are detection elements in the region R2 and show detection elements in contact with regions different from the region R2 to which the detection elements belong. The detection elements indicated by the symbol "△" are detection elements in the region R3 and show detection elements in contact with regions different from the region R3 to which the detection elements belong. The detection elements indicated by the symbol "▼" are detection elements in the region R4 and show detection elements in contact with regions different from the region R4 to which the detection elements belong.

In the method of dividing the detection surface of the SiPM 3 shown in FIG. 12 into four regions, assuming that a multiple event occurs between two detection elements of the detection elements indicated by the symbol "☆" and the detection element indicated by the symbol "☆" positioned next thereto, the output signals of these detection elements are added as described in FIG. 7, so that troubles due to division do not occur. This is because the detection elements indicated by the same symbol belong to the same region and these outputs are added.

However, if a multiple event occurs between two detection elements, i.e., a detection element indicated by the symbol "☆" and the detection element indicated by the symbol "○" positioned next to the detection element, the problem described with reference to FIG. 15 arises. In a more general expression, it can be said that the problem caused by this division arises between two detection elements adjacent to each other with different kinds of symbols. Since the detection elements indicated by the different symbols belong to different regions, these outputs will not be added. In the combination of these two detection elements, addition of signals cannot be performed even if a multiple event occurs.

Based on these circumstances, looking at the division of FIG. 16, among the two adjacent detection elements, there are four pairs of "☆" and "○", three of them belong to the region Rb and one belongs to the region Re. In other words, as to the combination of detection elements in which addition of signals cannot be performed even if a multiple event occurs in FIG. 12, like the symbol "☆" and the symbol "○", addition of all signals can be performed in the case shown in FIG. 16.

Such a situation can be applied to other combinations. Although there are four pairs of "☆" and "Δ" among two adjacent detection elements, three pairs of "☆" and "Δ" belong to the region Rd and one pair thereof belongs to the region Re. Further, although there are four pairs of "○" and "▼" among two adjacent detection elements, two pairs of "○" and "▼" belong to the region Re and two pairs thereof belongs to the region Rf. In the same manner, although there are four pairs of "▼" and "Δ" among two adjacent detection elements, two pairs of "▼" and "Δ" belong to the region Re and two pairs thereof belongs to the region Rh.

In other words, in the case shown in FIG. 12, as to the combination of detection elements in which addition of signals cannot be performed even if a multiple event occurs, addition of all signals can be performed in the case shown in FIG. 16. This is because the output signals of detection elements belonging to the same region are added. In this modified embodiment, it is configured so as not to cause the problem described with reference to FIG. 15 utilizing the aforementioned circumstances.

Figure 17:
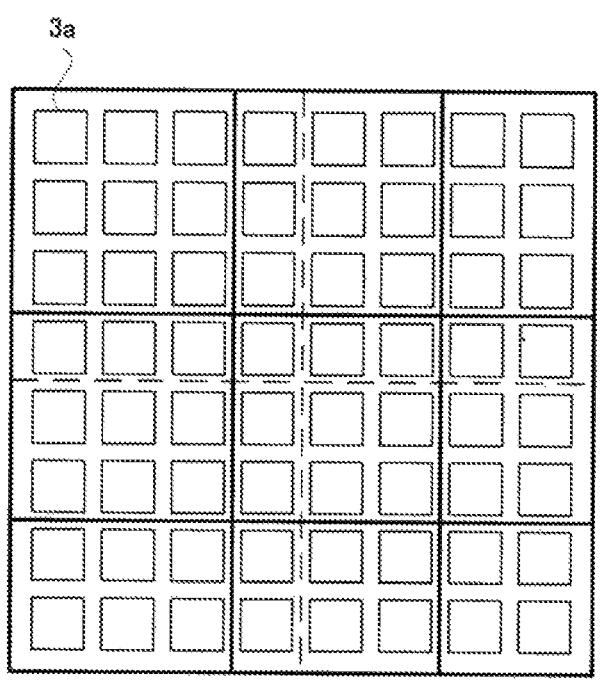
FIG. 17 is a schematic view illustrating one modified embodiment of the present invention.

For all combinations of detection elements that cannot add signals even if a multiple event occurs in FIG. 12, in order to prepare a division as shown in FIG. 16 in which signal addition can be performed, ingenuity is required. In FIG. 17, the division related to four divided regions explained with reference to FIG. 12 is indicated by broken lines, and the division related to nine divided regions explained with reference to FIG. 16 is indicated by solid lines. As can be understood with reference to FIG. 17, the boundary line of the four division and the boundary line of the nine division intersect at some portions, but there is no overlapped portion. In other words, the boundary line of the four division and the boundary line of the nine division do not pass between pairs of the same detection elements 3*a*. The division of nine divisions described with reference to FIG. 16 is configured based on such conditions. With such a configuration, there is no possibility that the pair of detection elements 3*a* divided into different regions in division related to four divisions are divided into different regions even if division related to nine divisions is made.

Therefore, according to this modified embodiment, a pair of detection elements 3*a* arranged adjacent to each other necessarily belongs to at least one region. Whether the region is related to four divisions or nine divisions depends on the position of the pair of detection elements 3*a*. That is, even in the division of FIG. 16, as shown in FIG. 15, a multiple events may occur across a plurality of regions.

Figure 18:
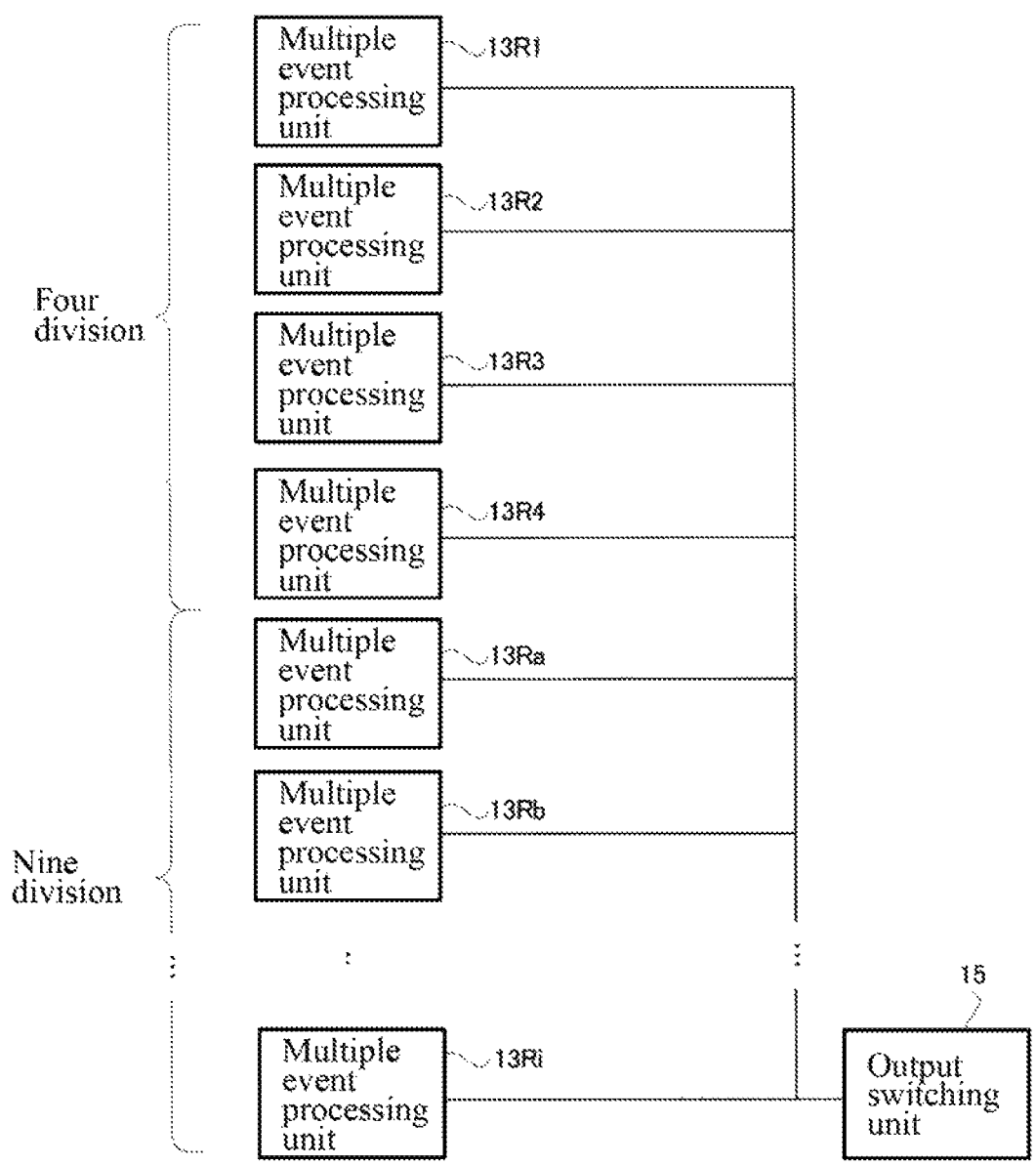
FIG. 18 is a schematic view illustrating one modified embodiment of the present invention.

Therefore, as shown in FIG. 18, in this modified embodiment, there are two sets, i.e., a set composed of multiple event processing units 13R1, 13R2, 13R3, and 13R4 according to four divisions shown in FIG. 12 and a set composed of multiple event processing units 13Ra to 13Ri related to nine divisions shown in FIG. 16. The signal duplication unit 11 duplicates the signals of the detection elements 3*a*1 to 3*a*64 to prepare a duplicate signal to be input to the multiple event processing unit 13 belonging to the set related to four divisions and a duplicate signal to be input to the multiple event processing unit 13 belonging to the set related to nine divisions. Each multiple event processing unit 13 operates based on a duplication of the signal prepared by the signal duplication unit 11.

Each of the multiple event processing units 13R1 to 13R4, 13Ra to 13Ri is connected to the output switching unit 15. The output switching unit 15 recognizes, when a multiple event occurred, which detection element captured the fluorescence based on the output of the detection element recognition unit 14 described with reference to FIG. 1. The output switching unit 15 changes passing of the output from any of multiple event processing units 13 in accordance with the detection element that detected the fluorescence.

Figure 19:
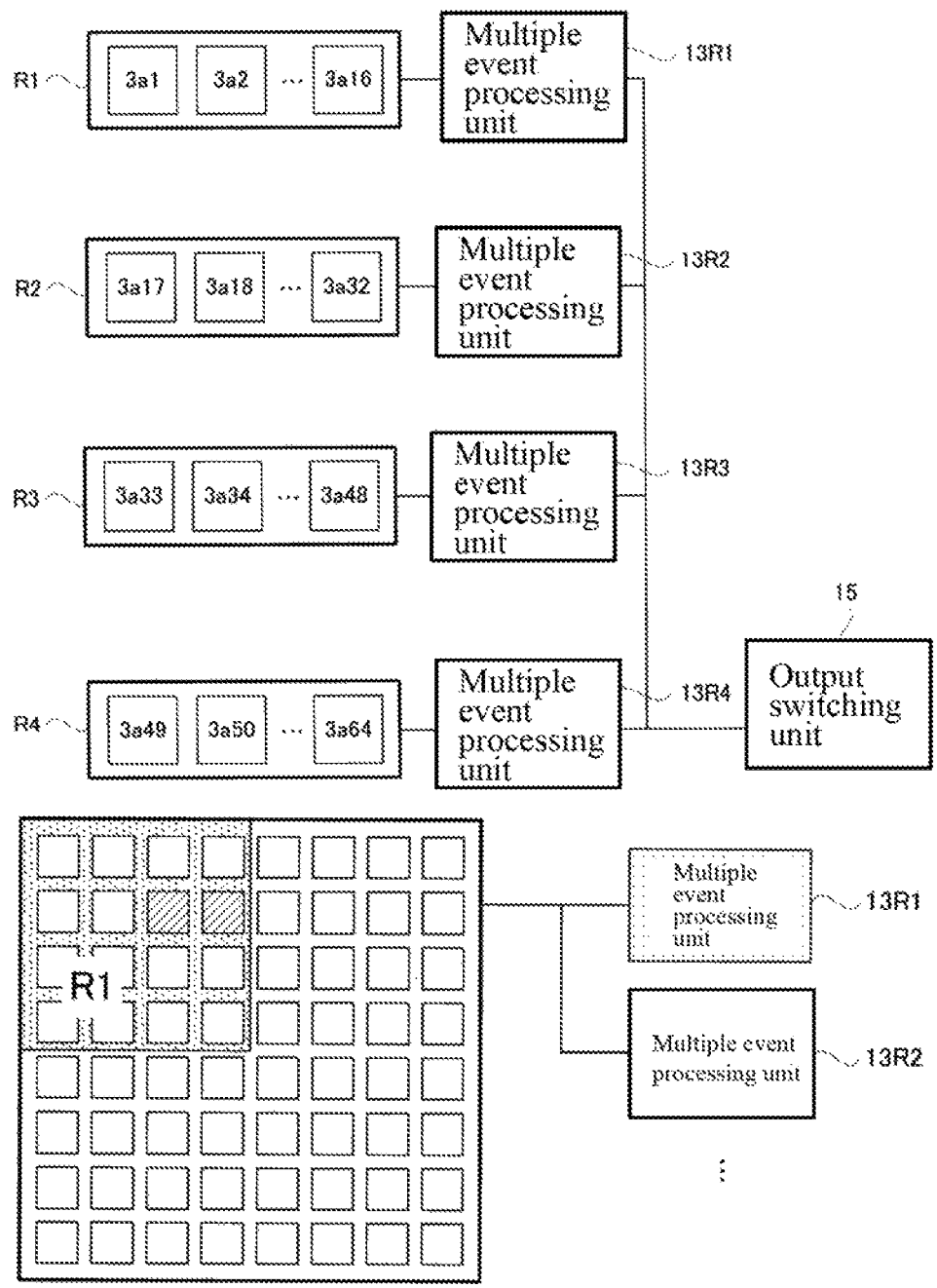
FIG. 19 is a schematic view illustrating one modified embodiment of the present invention.

The switching operation of the output switching unit 15 will be described. For example, it is assumed that fluorescence is detected by two detection elements shown by hatching in FIG. 19. Since these two detection elements belong to the region R1 among the four regions R1, R2, R3, and R4, only the multiple event processing unit 13R1 indicated by shading outputs an added signal time, and the multiple event processing units 13 related to the other regions R2, R3, and R4 do not output an added signal time.

Figure 20:
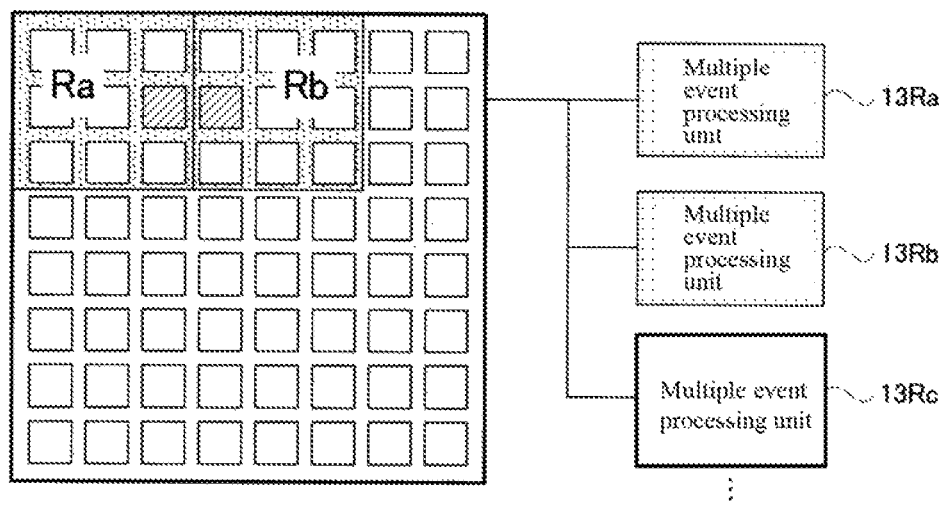
FIG. 20 is a schematic view illustrating one modified embodiment of the present invention.

It is not only the multiple event processing unit 13R1 that outputs an added signal time. As can be understood from FIG. 20, since one of two detection elements related to fluorescence detection belong to the region Ra related to nine divisions and the other detection element belongs to the region Rb, multiple event processing units 13Ra and 13Rb indicated by shading output added output signal times.

Figure 21:
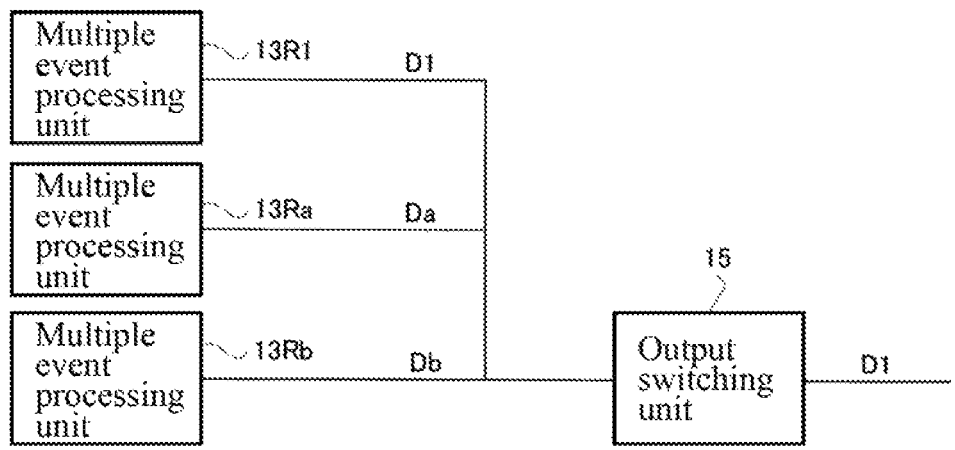
FIG. 21 is a schematic view illustrating one modified embodiment of the present invention.

As shown in FIG. 21, to the output switching unit 15, data D1, Da, and Db related to the added signal times from the multiple event processing units 13R1, 13Ra, and 13Rb are output. The output switching unit 15 is configured to select one of the multiple event processing units 13R1, 13Ra, and 13Rb that output the data, which is connected to the region to which both of the two detection elements that detected fluorescence according to a multiple event belong, and output data derived from the selected multiple event processing unit as the time of occurrence of fluorescence. In the case of the embodiments shown in FIGS. 19 and 20, since two detection elements related to fluorescence detection belong to each region R1 related to four divisions, the output switching unit 15 outputs the data D1 related to the multiple event processing unit 13R1 among the data D1, Da, and Db.

If there is only one division pattern for the detection element array in which detection elements 3a are arranged, a multiple event may occur across different regions. When a division is generated with a plurality of patterns as described above, all detection elements 3a that detected fluorescence related to a multiple event belong to the region defined by any of these divisions.

Figure 22:
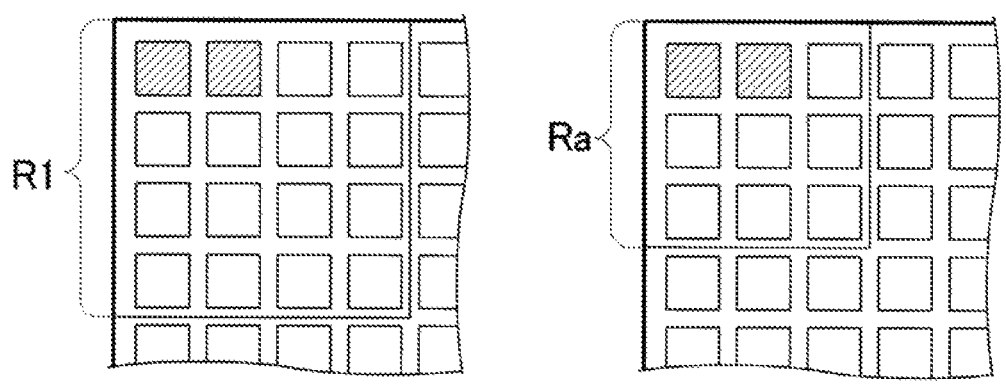
FIG. 22 is a schematic view illustrating one modified embodiment of the present invention.

In addition, as shown in FIG. 22, when two detection elements related to fluorescence detection belong to one of the regions related to four divisions and at the same time belong to one of the regions related to nine divisions, the multiple event processing unit 13R1 is configured to output the added signal time derived from the region related to nine divisions having the smaller number of detection elements belonging as the time of occurrence of fluorescence. This is because it is advantageous in terms of the S/N ratio as the number of detection elements related to the addition is smaller when generating the added signal.

Figure 23:
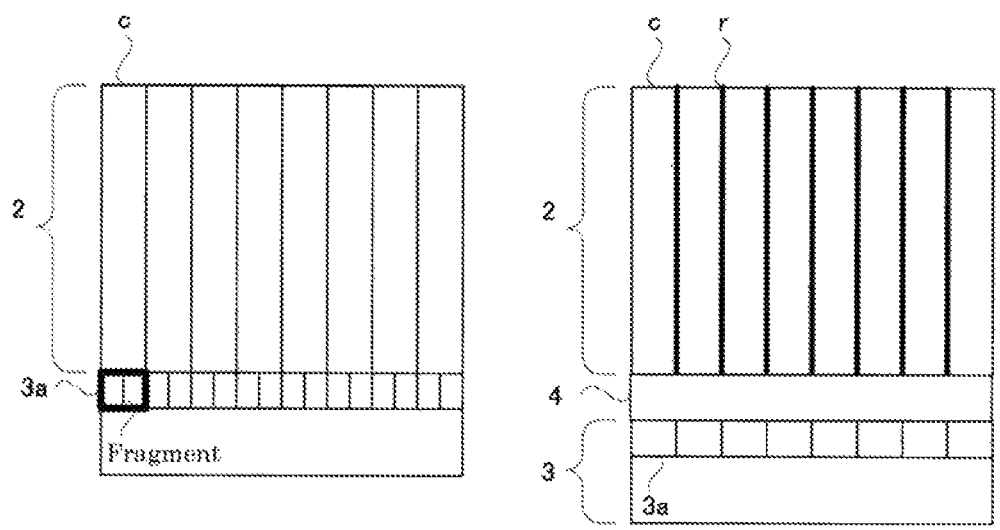
FIG. 23 is a schematic view illustrating one modified embodiment of the present invention.
Figure 24:
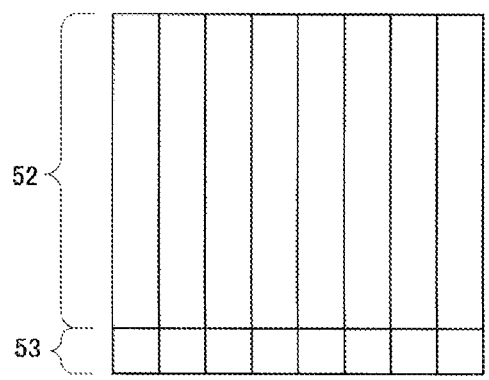
FIG. 24 is a schematic diagram illustrating a conventional radiation detector.
Figure 25:
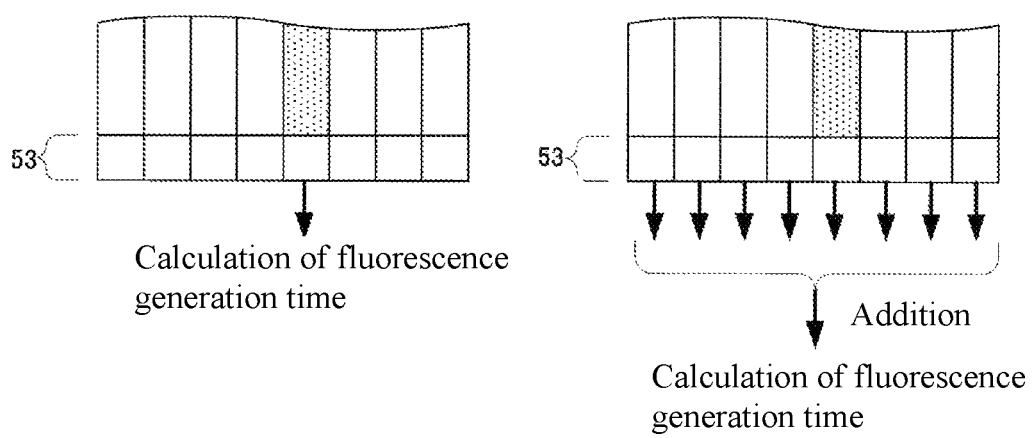
FIG. 25 is a schematic diagram illustrating a conventional radiation detector.
Figure 26:
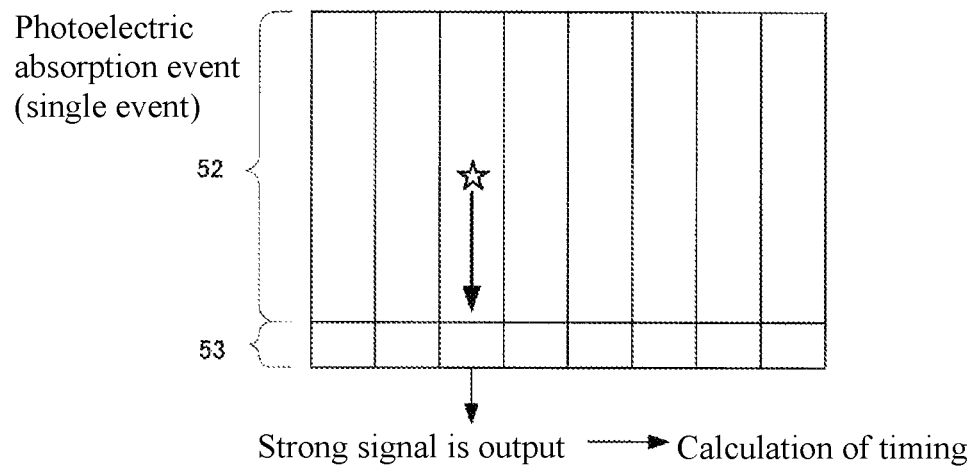
FIG. 26 is a schematic diagram illustrating a problem of the conventional radiation detector.

(3) As shown in the left side in FIG. 23, the detection element 3a according to the present invention may be constituted by a plurality of detection element fragments capable of independently detecting fluorescence.

(4) According to the configuration of Embodiment 1, the scintillator 2 and the SiPM 3 are directly coupled, but the invention is not limited to this configuration. As shown on the right side in FIG. 23, a configuration may be adopted in which a light guide 4 for passing fluorescence is provided at a position between the scintillator 2 and the SiPM 3. The light guide 4 optically couples the scintillator 2 and the SiPM 3.

(5) The present invention can be mounted on a radiation imaging device configured to detect a gamma (γ) ray such as a PET device. As described above, the present invention can be applied to various radiation detectors.

(6) The information processing device according to the present invention can also be realized by executing the following processing. That is, software for realizing the functions of the above-described embodiments is supplied to a system or an apparatus via a network or various storage media, and a computer (or CPU, MPU, etc.) of the system or apparatus reads the program to execute processing.

INDUSTRIAL APPLICABILITY

As described above, the present invention can be suitably applied in the field of medical.

DESCRIPTION OF REFERENCE SYMBOLS

C scintillator crystal
2 scintillator
3 light detector (SiPM)
3a detection element
11 Signal duplication unit (duplication means)
12 single event processing unit (single event processing means)
13 multiple event processing unit (multiple event processing means)
14 detection element recognition unit (detection element recognition means)
15 output switching unit (output switching means)

The invention claimed is:

1. An information processing device equipped with:
   a scintillator including scintillator crystals arranged in a matrix to convert radiation into fluorescence and a reflection plate for optically isolating adjacent scintillator crystals; and
   a light detector configured to include a plurality of detection elements each for detecting fluorescence to output a detection signal and optically coupled to the scintillator,
   wherein the information processing device is configured to be provided to a radiation detector configured to detect fluorescence emitted from one scintillator crystal by one detection element corresponding to the scintillator crystal,
   characterized in that the information processing device comprising:
   duplication means configured to duplicate the detection signal output from each detection element;
   single event processing means configured to calculate a single signal time which is a time of occurrence of fluorescence based on the detection signal derived from one detection element related to the detection of fluorescence among duplicated detection signals;
   multiple event processing means configured to calculate an added signal time which is the time of occurrence of fluorescence based on an added signal generated by adding duplicate detected signals;
   detection element recognition means configured to identify the detection element that detected the fluorescence among the detection elements provided in the light detector based on each duplicated duplicated detection signal; and
   output switching means configured to output the single signal time as the time of occurrence of fluorescence when the number of the detection elements related to fluorescence detection is 1, and output the added signal time as the time of occurrence when the number of the detection elements related to fluorescence detection is plural.

2. The information processing device as recited in claim 1, wherein
   the multiple event processing means calculates the added signal time by the added signal calculated based on all of the detection elements of the light detector.

3. The information processing device as recited in claim 1, wherein
   the multiple event processing means calculates the added signal time by the added signal calculated based on some of the detection elements of the light detector.

4. The information processing device as recited in claim 3, wherein
   the multiple event processing means calculates the added signal time for each region formed by dividing a detection element array in which the detection elements in the light detector are arranged according to a certain division, and
   the output switching means outputs, when the number of detection elements related to the fluorescence detection is plural, the added signal time derived from the region including all of the detection elements related to the fluorescence detection among the added signal times as the time of occurrence of fluorescence.

5. The information processing device as recited in claim 4, wherein
   the multiple event processing means is configured to calculate the added signal time for each region formed by dividing the detection element array with a plurality of divisions, and a boundary line related to a certain division and a division boundary line related to another division do not pass between the same pair of detection elements.

6. A radiation detector equipped with the information processing device as recited in claim 1.

7. The radiation detector as recited in claim 6, wherein the detection element and the scintillator crystal are optically coupled in a one-to-one correspondence.

8. The radiation detector as recited in claim 6, wherein the detection element is constituted by a plurality of detection element fragments capable of independently detecting fluorescence.

9. The radiation detector as recited in claim 6, wherein a light guide for optically coupling the scintillator and the light detector is provided.

10. A radiation imaging device provided with the information processing device as recited in claim 1.

11. A program causing a computer to function as each means of the information processing device as recited in claim 1.

* * * * *